US008620066B2

(12) United States Patent
Kozakaya et al.

(10) Patent No.: US 8,620,066 B2
(45) Date of Patent: Dec. 31, 2013

(54) THREE-DIMENSIONAL OBJECT DETERMINING APPARATUS, METHOD, AND COMPUTER PROGRAM PRODUCT

(75) Inventors: Tatsuo Kozakaya, Kanagawa (JP); Susumu Kubota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 13/233,644

(22) Filed: Sep. 15, 2011

(65) Prior Publication Data

US 2012/0027292 A1 Feb. 2, 2012

Related U.S. Application Data

(63) Continuation of application No. PCT/JP2009/066660, filed on Sep. 25, 2009.

(30) Foreign Application Priority Data

Mar. 26, 2009 (JP) ................................. 2009-076918

(51) Int. Cl.
*G06K 9/00* (2006.01)

(52) U.S. Cl.
USPC ........................................................ 382/154

(58) Field of Classification Search
None
See application file for complete search history.

(56) References Cited

U.S. PATENT DOCUMENTS

| 7,706,601 | B2 * | 4/2010 | Hamanaka | 382/154 |
| 7,711,156 | B2 * | 5/2010 | Kim et al. | 382/118 |
| 7,764,828 | B2 * | 7/2010 | Sasaki et al. | 382/154 |
| 7,860,340 | B2 * | 12/2010 | Marugame et al. | 382/274 |
| 7,894,636 | B2 * | 2/2011 | Kozakaya | 382/118 |
| 8,090,160 | B2 * | 1/2012 | Kakadiaris et al. | 382/118 |
| 2008/0192990 | A1 | 8/2008 | Kozakaya | |
| 2009/0225099 | A1 * | 9/2009 | Yuasa | 345/629 |

FOREIGN PATENT DOCUMENTS

| JP | 11-339048 | 12/1999 |
| JP | 2003-178306 | 6/2003 |
| JP | 2005-135271 | 5/2005 |
| JP | 2006-235718 | 9/2006 |
| JP | 2006-330936 | 12/2006 |
| JP | 2008-194146 | 8/2008 |

OTHER PUBLICATIONS

International Search Report from the Japanese Patent Office in International Application No. PCT/JP2009/06660 mailed Oct. 27, 2009.
Yuasa et al., "Automatic Facial Feature Point Detection for Face Recognition from a Single Image," IEICE Technical Report (2007), pp. 5-10.
Kozakaya et al., "Projection-based 3D Normalization for Face Recognition," IEICE Technical Report (2005), pp. 49-54.

* cited by examiner

*Primary Examiner* — Samir Ahmed
(74) *Attorney, Agent, or Firm* — Finnegan, Henderson, Farabow, Garrett & Dunner, L.L.P.

(57) ABSTRACT

According to one embodiment, a three-dimensional object determining apparatus includes: a detecting unit configured to detect a plurality of feature points of an object included in an image data that is acquired; a pattern normalizing unit configured to generate a normalized pattern that is normalized by a three-dimensional model from the image data using the plurality of feature points; an estimating unit configured to estimate an illumination direction in which light is emitted to the object in the image data from the three-dimensional model and the normalized pattern; and a determining unit configured to determine whether or not the object in the image data is a three-dimensional object on the basis of the illumination direction.

9 Claims, 4 Drawing Sheets

THREE-DIMENSIONAL OBJECT DETERMINING APPARATUS, METHOD, AND COMPUTER PROGRAM PRODUCT

CROSS-REFERENCE TO RELATED APPLICATIONS

This application is a continuation of PCT international application Ser. No. PCT/JP2009/066660 filed on Sep. 25, 2009 which designates the United States; the entire contents of which are incorporated herein by reference.

FIELD

Embodiments described herein relate generally to a three-dimensional object determining apparatus, a three-dimensional object determining method, and a computer program product for three-dimensional object determining.

BACKGROUND

In the related art, an identity determining system using the image of a face has a problem of identity theft using, for example, a picture. In order to prevent the identity theft using the picture, it is necessary to determine whether the face input from, for example, a camera is a user's own face or a face that is present on a plane, such as a picture.

In order to meet the requirements, there is a conventional technique that detects the feature points of the face from an acquired image (data) and determines biometric identity on the basis of whether the movement information of the feature point during registration is identical to that during authentication. In addition, there is another technique that determines biometric identity on the basis of a change in an eye region or a mouth region.

However, a change in the movement of the feature point or a change in a local pattern has specifically only two-dimensional information. Therefore, although it can detect a planar change in the face in the image, it is generally difficult to determine whether or not the face has a three-dimensional shape. In addition, it is necessary to force the user to make an unnatural action, such as making a change in expression.

On the other hand, when a stereo camera is used to directly calculate the depth of an acquired image, it is possible to determine whether or not the face has a three-dimensional shape. However, in this case, a plurality of cameras or a special apparatus is needed, which makes applicable fields of the apparatus narrow.

BRIEF DESCRIPTION OF THE DRAWINGS

FIG. 5-1 is a diagram schematically illustrating an influence of illumination in a three-dimensional face;

FIG. 5-2 is another diagram schematically illustrating an influence of illumination in a three-dimensional face.

FIG. 5-3 is a diagram schematically illustrating an influence of illumination in a planar face.

DETAILED DESCRIPTION

According to one embodiment, a three-dimensional object determining apparatus includes: a detecting unit configured to detect a plurality of feature points of an object included in an image data that is acquired; a pattern normalizing unit configured to generate a normalized pattern that is normalized by a three-dimensional model from the image data using the plurality of feature points; an estimating unit configured to estimate an illumination direction in which light is emitted to the object in the image data from the three-dimensional model and the normalized pattern; and a determining unit configured to determine whether or not the object in the image data is a three-dimensional object on the basis of the illumination direction.

Hereinafter, a three-dimensional object determining apparatus, a three-dimensional object determining method, and a computer program product for use in three-dimensional object determining according to exemplary embodiments will be described in detail with reference to the accompanying drawings.

First Embodiment

Figure 1:
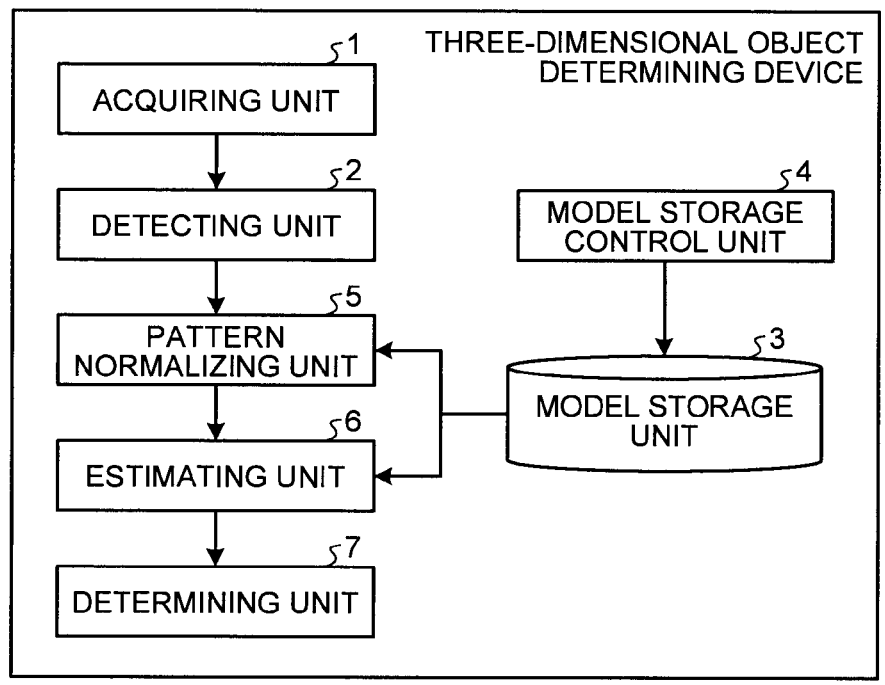
FIG. 1 is a block diagram illustrating the structure of a three-dimensional object determining apparatus according to a first embodiment.

FIG. 1 is a block diagram illustrating a structure of a three-dimensional object determining apparatus according to a first embodiment. The three-dimensional object determining apparatus includes an acquiring unit 1, a detecting unit 2, a model storage unit 3, a model storage control unit 4, a pattern normalizing unit 5, an estimating unit 6, and a determining unit 7.

The acquiring unit 1 acquires image data including a target object. The target object is the face of a person. The image data acquired by the acquiring unit 1 is for example: image data captured by an imaging apparatus such as a camera connected via USB (USB camera) or a digital camera; image data acquired by a scanner or other special apparatuses; or image data stored in a storage device such as an HDD, a videotape, or a DVD. In addition, the acquiring unit 1 may acquire image data from an external apparatus through, for example, a network.

The detecting unit 2 detects a plurality of face feature points from the acquired image data. The face feature points may be detected by any technique, for example, those disclosed in Yuasa, et al., "Automatic Extraction of Face Feature Points for Authenticating Face in Still Image", IEICE Technical Report PRMU 2006-222, pp. 5-10, 2007 may be used to detect a total of 14 face feature points including the pupil, the nostrils, the tail of the eye, the inner corner of the eye, the oral end, the inner end of the eyebrow, the tip of the nose, and the middle point of the mouth.

The number or kind of feature points to be detected is not particularly limited, but it is preferable that four or more feature points which are not present on the same plane be obtained when a normalized pattern is calculated. In the following description, it is assumed that a sufficient number of face feature points (for example, 14 face feature points) are obtained in order to generate the normalized pattern. However, even when the number of feature points is changed, the proposed three-dimensional object determining method can apply the change.

The model storage unit 3 stores a three-dimensional model used to estimate illumination. When the three-dimensional shape of the face included in the acquired image data has been known, it is possible to perform processing with the highest accuracy. However, in practice, it is not so often that the shape of a target face has been known. Therefore, the model storage unit 3 stores a general three-dimensional model, such as the average shape of the face. The model storage unit 3 may store various kinds of three-dimensional models, such as races for example Asian races and different sexes, instead of the general three-dimensional model. In this case, the pattern normalizing unit 5 and the estimating unit 6 need to change the three-dimensional model to be used according to a situation.

The three-dimensional model is represented by a set of coordinates (x, y, z) of the shape of the face. In this embodiment, it is assumed that a normal vector ($n_x$, $n_y$, $n_z$) at each coordinate is obtained. It is possible to calculate the normal vector from the three-dimensional coordinates. Therefore, even when the normal vector is not given in advance, the normal vector may be calculated by for example an initializing process.

The model storage control unit 4 controls the model storage unit 3 to store the three-dimensional model.

The pattern normalizing unit 5 generates a face pattern having, for example, a normalized size from the three-dimensional model, the acquired image data, and a plurality of detected feature points. As the normalizing method, affine transformation may be used, which maintains a position, a size, or rotation in the screen using the pupil, the nostrils or the like. However, when the face that does not face the front is input, distortion occurs in the normalized pattern. Therefore, in this embodiment, a three-dimensional normalizing method that performs normalization using a three-dimensional model is used (Kozakaya Tatsuo and Yamaguchi Osamu, "Projection-based 3D Normalization for Face Recognition", PRMU 2005-101, pp. 49-54, 2005).

The three-dimensional normalizing method defines the kind of feature points (for example, the pupil and the nostrils) detected from the image and the coordinates of the same kind of feature points on the three-dimensional model, and calculates the positional relation between the feature points on the image and the feature points on the three-dimensional model, thereby calculating the correspondence between the image of the face and the entire three-dimensional model. In addition, during the estimation of the illumination direction, when the positions between, for example, the pupils or the noses in the normalized face pattern and the three-dimensional model are associated with each other, the accuracy of estimation is the highest. Therefore, the three-dimensional normalizing method that performs a normalizing process according to the three-dimensional model is preferable since it explicitly calculates the correspondence between the image and the three-dimensional model.

The sentence "correspondence between the normalized pattern and the three-dimensional model is obtained" means that the brightness value (color information) $I_i$ of the face pattern is obtained at the i-th coordinates ($x_i$, $y_i$, $z_i$) of the three-dimensional model. It is possible to calculate the brightness value of a normalized pattern at any coordinates on the three-dimensional model using the three-dimensional normalizing method.

The estimating unit 6 estimates the illumination direction in which light is emitted to the face in the image data from the normalized face pattern and the three-dimensional model. If the surface of the face is a Lambertian surface and light is emitted in one direction from a point light source, the brightness value $I_i$ of a point i on the surface of the face may be defined by the following Expression (1).

$$I_i = al \max(n_i \cdot s, 0) + I_a \quad (1)$$

In Expression (1), a is the albedo of the surface of the face, l is reflectance, $n_i$ is a normal vector at the point i, s an illumination directional vector, and $I_a$ is a bias by, for example, environmental light. It is assumed that the albedo, the reflectance, and the bias are constant in the entire face. In addition, since there is no negative amount of light, the maximum value is controlled so as to be zero.

When Expression (1) is considered in order to calculate the brightness value of the entire extracted face pattern and a maximum value function is neglected for simplicity, the brightness value may be defined by a matrix represented by the following Expression (2).

$$\begin{bmatrix} I_1 \\ I_2 \\ \vdots \\ I_N \end{bmatrix} = al \begin{bmatrix} n_{x1} & n_{y1} & n_{z1} & 1 \\ n_{x2} & n_{y2} & n_{z2} & 1 \\ \vdots & \vdots & \vdots & \vdots \\ n_{xN} & n_{yN} & n_{zN} & 1 \end{bmatrix} \begin{bmatrix} s_x \\ s_y \\ s_z \\ I_a \end{bmatrix} \quad (2)$$

A pseudo inverse matrix of the matrix (hereinafter, referred to as a normal matrix for simplicity) defined by a normal vector ($n_{xi}$, $n_{yi}$, $n_{zi}$, 1) may be calculated and the illumination directional vector represented by the following Expression (3) may be calculated using the pseudo inverse matrix. In Expression (3), † is an operator for calculating the pseudo inverse matrix.

$$al \begin{bmatrix} s_x \\ s_y \\ s_z \\ I_a \end{bmatrix} = \begin{bmatrix} n_{x1} & n_{y1} & n_{z1} & 1 \\ n_{x2} & n_{y2} & n_{z2} & 1 \\ \vdots & \vdots & \vdots & \vdots \\ n_{xN} & n_{yN} & n_{zN} & 1 \end{bmatrix}^\dagger \begin{bmatrix} I_1 \\ I_2 \\ \vdots \\ I_N \end{bmatrix} \quad (3)$$

In order to remove the influence of, for example, the albedo, normalization may be performed so that the illumination directional vector (sx, sy, sz) is norm 1, thereby obtaining the final illumination direction. In addition, when the three-dimensional model is constant, the normal matrix calculated by Expression (2) does not vary. Therefore, the pseudo inverse matrix of the normal matrix is calculated for each three-dimensional model in advance and the calculated pseudo inverse matrix is stored in the model storage unit 3. In this case, basically, it is possible to estimate the illumination direction only by calculating the inner product of the inverse matrix and the pattern vector obtained from the normalized pattern. Therefore, it is possible to perform processing at a very high speed.

In this embodiment, it is assumed that the surface of the face is the Lambertian surface and that the negative amount of light is neglected. Therefore, in some cases, the calculated illumination direction is not necessarily identical to the actual illumination direction. However, in the embodiment, since the illumination direction is used only to discriminate a three-dimensional object from a picture, the direction of the light source is not necessarily strictly aligned. Therefore, much problem does not occur.

It is noted that the "illumination direction" calculated on the basis of the normalized pattern obtained by the three-dimensional normalizing method is based on the coordinate system on the normalized pattern. In the face pattern obtained by the three-dimensional normalizing method, the direction of the face is normalized so as to be the same (in general, the front direction) as that in the three-dimensional model. Therefore, for example, when the illumination environment is fixed and the direction of the face is moved from the front to the side, the illumination direction seems to be relatively moved since the direction of the face is normalized. When the illumination direction based on the coordinate system on the image is needed, it is possible to convert the illumination direction into an illumination direction on the image using a motion matrix (a matrix indicating the correspondence between the detected face feature points and the feature points on the three-dimensional model) that is calculated for three-dimensional normalization.

The determining unit 7 determines whether or not the face in the acquired image data is a three-dimensional object on the basis of the estimated illumination direction. Various methods may be considered in order to perform the determination using the illumination direction. However, any method may be used to perform the determination. For example, when the environment of the position where the determination is performed has been known, the illumination direction corresponding to the environment has been known. Therefore, it is possible to determine whether there is a three-dimensional face at the position by checking whether the illumination direction is aligned with the estimated illumination direction. When it is determined that the position is affected by, for example, external light, the surrounding illumination conditions may be estimated considering, for example, time, a position, a direction, and weather, and it may be determined whether the illumination direction is aligned with the illumination direction of an input face image on the basis of the estimation result.

When it is determined whether or not the face is a face in the picture or the real face of a person during face recognition, the user may record the illumination direction when registration has previously been performed at that position and check whether the illumination direction is aligned with that during the registration when authentication is performed, thereby determining whether the face is the rear face of a person. When the user's own face is not registered, for example, the average of the illumination directions of other users may be used. When it is determined whether the illumination directions are aligned with each other, any standard, such as the inner product of the illumination directional vector or the magnitude of the difference between the illumination directional vectors may be used. In addition, a statistic, such as the average or minimum value of a plurality of frames or a variance, may be used to perform the determination.

Figure 2:
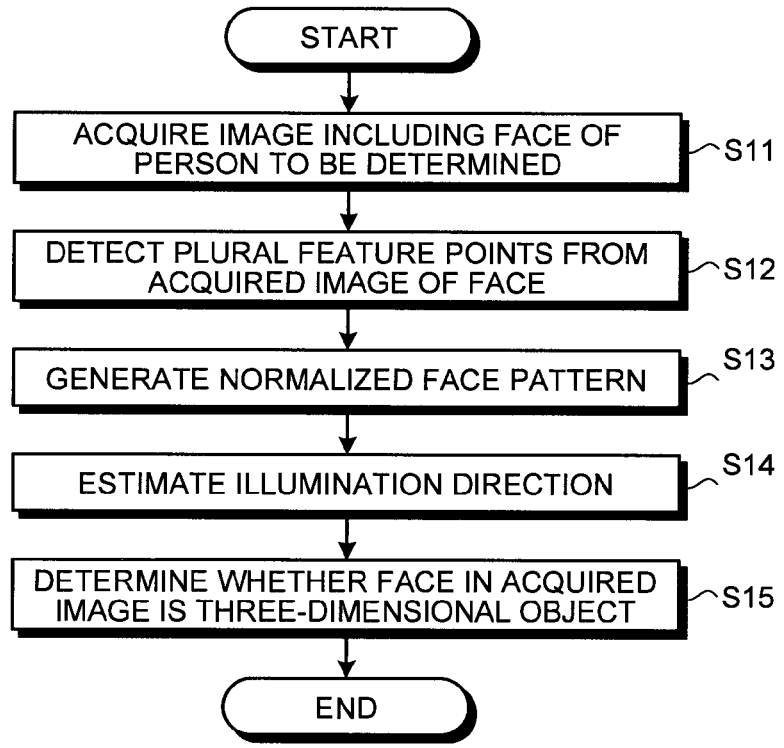
FIG. 2 is a flowchart illustrating an operation of the three-dimensional object determining apparatus according to the first embodiment.

Next, the operation of the three-dimensional object determining apparatus according to the first embodiment will be described. FIG. 2 is a flowchart illustrating the operation of the three-dimensional object determining apparatus according to the first embodiment.

First, the acquiring unit 1 acquires an image including an object (the face of a person) to be determined (Step S11). Then, the detecting unit 2 detects a plurality of feature points from the image of the face acquired by the acquiring unit 1 (Step S12). Then, the pattern normalizing unit 5 generates a normalized face pattern that is normalized in size and the like, from the three-dimensional model stored in the model storage unit 3; the image of the face acquired by the acquiring unit 1; and the plurality of feature points detected by the detecting unit 2 (Step S13). The estimating unit 6 estimates the illumination direction on the basis of the normalized face pattern obtained by the pattern normalizing unit 5 and the normal vector of the three-dimensional model (Step S14). Finally, the determining unit 7 determines whether or not the face in the acquired image is a three-dimensional object on the basis of the illumination direction obtained by the estimating unit 6 (Step S15).

In this way, it is determined whether or not the acquired image of the face is a three-dimensional object, that is, whether or not another person uses the picture for identity thief.

Modification 1

Figure 3:
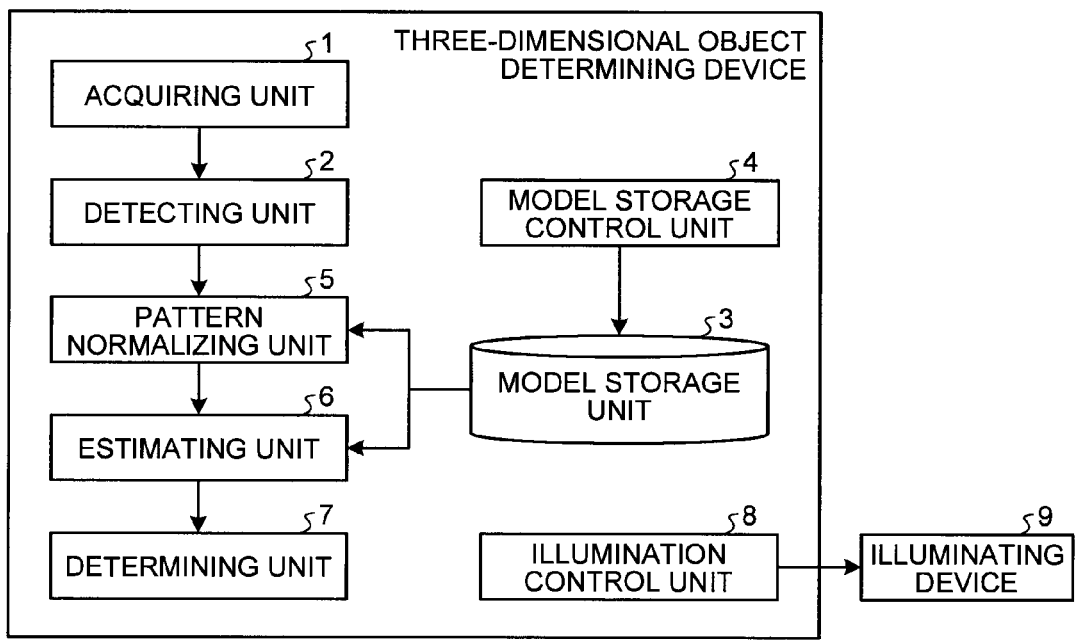
FIG. 3 is a block diagram illustrating the structure of a three-dimensional object determining apparatus according to a modification of the first embodiment.

In this embodiment, the determining unit 7 compares the current illumination environment with an illumination direction that is estimated to determine whether or not the face is a three-dimensional object. However, an illuminating device that affects the illumination conditions of the surface of the face of the user may be separately provided; and the three-dimensional object determining apparatus may control the illuminating device. FIG. 3 is a block diagram illustrating the structure of a three-dimensional object determining apparatus according to the modification of the first embodiment. The three-dimensional object determining apparatus according to the modification further includes an illumination control unit 8. The illumination control unit 8 is connected to an illuminating device 9.

The illuminating device 9 emits light to the user in a specific direction; and the illumination control unit 8 controls the turning-on or turning-off of the illuminating device 9. When the illumination direction estimated by the estimating unit 6 varies depending on whether the illuminating device 9 is turned on or off controlled by the illumination control unit 8, the determining unit 7 can determine that the face in the acquired image data is a three-dimensional object. When the image is a planar object, such as a picture, the illumination direction does not vary regardless of whether the illuminating device 9 is turned on or off by the illumination control unit 8. Therefore, it is possible to discriminate a three-dimensional object with high accuracy.

Modification 2

In this embodiment, the pattern normalizing unit 5 generates the normalized pattern of the entire face. However, the range of the normalized pattern to be generated may not limited to be the entire face, but may be a portion of the face or a combination of a plurality of portions. When there is a normal vector corresponding to the normalized pattern, the estimating unit 6 can estimate the illumination direction, without limiting into the region of the normalized pattern. Therefore, any face region may be used. In addition, the pattern normalizing unit 5 may generate the normalized patterns of a plurality of regions, the estimating unit 6 may estimate the illumination direction from each of the normalized patterns, and the determining unit 7 may determine whether the face is a three-dimensional object. For example, only a region in the vicinity of the nose having a relatively clear contour in the face of a person may be used to determine whether or not the face is a three-dimensional object. Alternatively, the region of the face may be divided into the left and right regions; the determination may be performed on each of the divided regions; and the determination results may be combined with each other.

As such, according to the three-dimensional object determining apparatus according to the first embodiment, it is possible to estimate the illumination direction in which light is emitted to the face (object) in the image data from the image data including the acquired face (object) and accurately determine whether the person (object) having the image included in the image data is himself (or herself) (three-dimensional object) on the basis of the illustration direction.

Second Embodiment

In the first embodiment, the determining unit 7 determines whether or not the face is a three-dimensional object only on the basis of the illumination direction. However, in a second embodiment, the determining unit 7 determines whether the face is a three-dimensional object on the basis of the direction of the face in the acquired image in addition to the illumination direction. The second embodiment will be described below with reference to the accompanying drawings. The difference between the structure of the three-dimensional object determining apparatus according to this embodiment and the structure of the three-dimensional object determining apparatus according to the first embodiment will be described below. In this embodiment, the same components as those in the first embodiment are denoted by the same reference numerals and a description thereof will be omitted.

Figure 4:
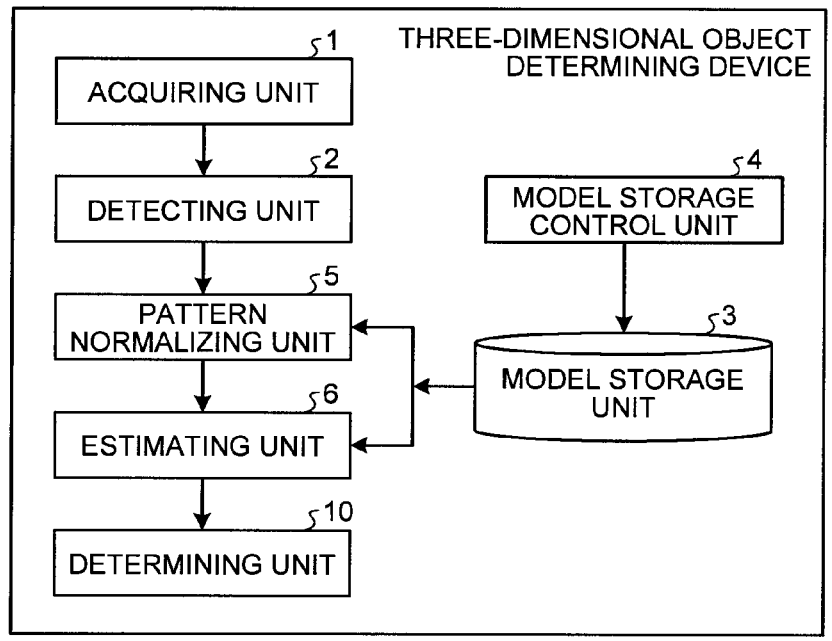
FIG. 4 is a block diagram illustrating a structure of a three-dimensional object determining apparatus according to a second embodiment.

FIG. 4 is a block diagram illustrating the structure of the three-dimensional object determining apparatus according to a second embodiment. The three-dimensional object determining apparatus includes an acquiring unit 1, a detecting unit 2, a model storage unit 3, a model storage control unit 4, a pattern normalizing unit 5, an estimating unit 6, and a determining unit 10.

Figures 1, 5:
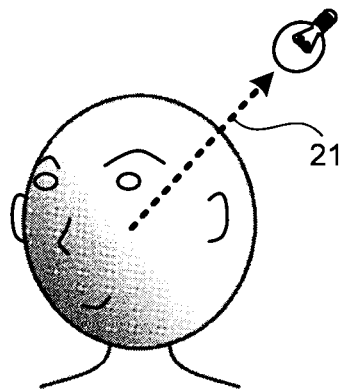
Figures 2, 5:
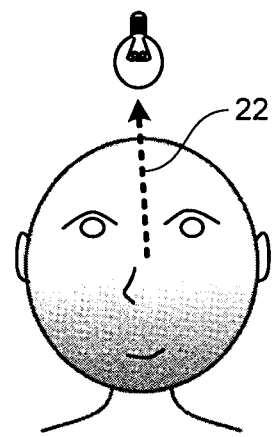
Figures 3, 5:
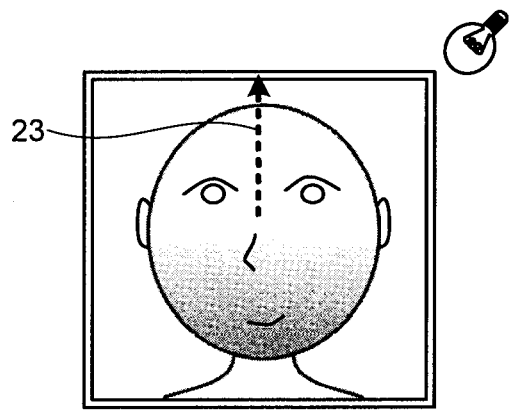

The determining unit 10 determines whether a face in the acquired image data is a three-dimensional object or not on the basis of the estimated illumination direction and the calculated direction of the face in the acquired image data. FIG. 5-1 is a diagram schematically illustrating the influence of illumination in a three-dimensional face. A dashed line 21 indicates the estimated illumination direction. FIG. 5-2 is a diagram schematically illustrating the influence of illumination in a three-dimensional face. A dashed line 22 indicates the estimated illumination direction. FIG. 5-3 is a diagram schematically illustrating the influence of illumination in a planar face. A dashed line 23 indicates the estimated illumination direction. FIG. 5-3 shows a face in a picture. In a case in which a plurality of images of a three-dimensional object is acquired, when the direction of the face is changed, the illumination direction is also changed (it is noted that the illumination direction is based on the coordinate system on the three-dimensional model). In a planar object such as a picture, the direction of the face or the illumination direction is not changed, regardless of the movement of the picture. The determining unit 10 uses this principle for determination.

Next, a determining method of the determining unit 10 based on the illumination direction and the direction of the face will be described. A rotation matrix M indicating the direction of the face may be calculated from the face feature points detected by the detecting unit 2 and the face feature points on the three-dimensional model by, for example, the method disclosed in JP-A 2008-194146 (KOKAI). In addition, when a directional vector indicating the direction of the face is represented by a unit vector (0, 0, 1) parallel to the z coordinate in the coordinate system on the three-dimensional model, a directional vector x indicating the direction of the face on the screen may be calculated by the product of the rotation matrix M and the directional vector x.

In this case, when an illumination directional vector based on the coordinate system of the three-dimensional model is y, in the case that the object is of a three-dimensional one, x and y are changed on the basis of a given relation therebetween. In the case of a planar object such as a picture, x and y are not changed; or if any, a change not related to the vectors and is of such as noise occurs. There are various kinds of methods of checking the relation between the vectors. In this embodiment, applied is a determining method with verification using multiple regression. Of course, any method other than the above-mentioned method may be used to determine the relation between the direction of the face and the illumination direction.

First, the acquiring unit 1 acquires a plurality of images (frame) in a moving picture sequence. When the direction of a face in an i-th image is $x_i$ and an illumination direction is $y_i$, it is assumed that the relation therebetween is represented by the following expression.

$$y_i = A x_i \quad (4)$$

In the above-mentioned expression, $x_i$ and $y_i$ are three-dimensional vectors, and a matrix A is a 3×3 matrix. There are 9 unknowns in Expression (4). Therefore, when there are three or more frames of images, it is possible to easily solve Expression (4) using for example the least-squares method.

The illumination direction $Y_i$ predicted from the direction $x_i$ of the face is calculated by Expression (5) on the basis of the matrix A obtained from Expression (4).

$$Y_i = A x_i \quad (5)$$

In this case, a total variability $S_T$ can be represented by the sum of a variability $S_R$ due to multiple regression and a residual variability $S_E$ and can be defined by the following Expression (6).

$$S_T = \sum_{i=1}^{n}(y_i - y)^2, S_R = \sum_{i=1}^{n}(Y_i - Y)^2, S_E = \sum_{i=1}^{n}(y_i - Y_i)^2 \quad (6)$$

In Expression (6), y indicates the average of an illumination directional vector, Y indicates the average of the illumination directional vector predicted by the matrix A, and n indicates the number of frames used.

In this case, unbiased variances $V_R$ and $V_E$ and a variance ratio $F_0$ are defined by the following Expression (7). In Expression (7), p is a constant indicating the degree of freedom.

$$V_R = \frac{S_R}{p}, V_E = \frac{S_E}{n-p-1}, F_0 = \frac{V_R}{V_E} \quad (7)$$

When the variance ratio $F_0$ is more than a predetermined threshold value, the multiple regression equation defined by Expression (4) is useful to predict a target variate Y. That is, this expression indicates that the illumination direction can be predicted from the direction of the face, and the variances and the variance ratio vary depending on the relation therebetween. In other words, it is possible to identify the user's own face having a three-dimensional shape. On the other hand, when the variance ratio $F_0$ is equal to or less than the threshold value, it is difficult to estimate the illumination direction from the direction of the face. That is, it is possible to determine that there is no relation between the variances and the variation ratio (which can be represented by at least a line). In the case of a picture, the illumination direction which is the direction of the face is ideally constant. However, the illumination direction is not constant in all of the frames due to for example an error in the detection of the face feature point. However, it is considered that variations in the illumination directions and the directions of the face caused by noise such as the detection error are not related with each other. Therefore, it is possible to determine that the face is a face on the plane such as a picture using verification.

Modification 3

In the embodiment, the illumination direction based on the three-dimensional model is used so that both the direction of the face and the illumination direction are changed depending on the movement of the face; and the movement is used to determine whether the face is a three-dimensional object. On the other hand, an illumination direction based on the coordinate system of the acquired image may be used to determine whether or not the face is a three-dimensional object. When the illumination condition during the capture of the acquired image is constant, the illumination directional vector converted into the coordinate system of the image is constant regardless of the direction of the face. In the case of a face on a picture, both the direction of the face and the illumination direction are constant. Therefore, when the direction of the face and the illumination directional vector are observed using a plurality of frames and the illumination direction is constant, it may be determined that the face is a three-dimensional face even though the direction of the face is changed.

For example, for the illumination direction and the direction of the face on the images extracted from a plurality of frames, the sum of the standard deviation (or variance) of a change in the illumination direction and the standard deviation of a change in the direction of the face is calculated. When the sum is less than a threshold value, the illumination direction and the direction of the face are not changed; and it is determined that the face is not a three-dimensional object. During determination, in many cases, it is considered that the user is generally stopped and moves the face. Therefore, the entire movement of the face feature points on the screen may be normalized for determination. For example, the standard deviation of the barycentric coordinates of the feature point may be calculated and the standard deviations of the direction of the face and the illumination direction may be normalized with the standard deviation of the center of the feature point.

The determining method according to this embodiment and the determining method according to the first embodiment may be combined with each other, so that, it is possible to improve the accuracy of determination.

Modification 4

Figure 6:
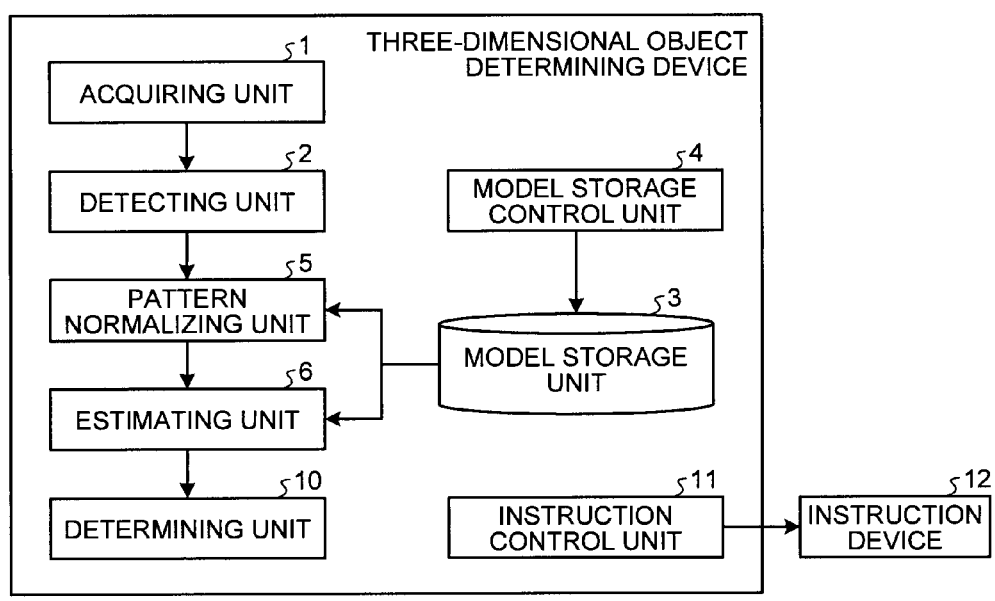
FIG. 6 is a block diagram illustrating a structure of a three-dimensional object determining apparatus according to a modification of the second embodiment.

In this embodiment, it is determined whether or not the face is a three-dimensional object using a plurality of frames. Therefore, the direction of the acquired face needs to be changed. For example, when the user does not move at all, it is difficult to discriminate a picture from a three-dimensional object. Therefore, in order to determine the face of the user, an instruction device that instructs the user to move the user's face may be separately provided and the three-dimensional object determining apparatus may control the instruction device. FIG. 6 is a block diagram illustrating the structure of a three-dimensional object determining apparatus according to a modification of the second embodiment. The three-dimensional object determining apparatus according to the modification further includes an instruction control unit 11. The instruction control unit 11 is connected to an instruction device 12.

The instruction device 12 instructs the user to move the user's face. The instruction device 12 instructs the user to move the user's face with a method of using information that can be perceived by the user, such as an image, light, and a sound. The instruction control unit 11 controls the operation of the instruction device 12. When the user moves the user's face in response to an instruction by the instruction device 12 that is controlled by the instruction control unit 11, the determining unit 10 can discriminate a picture from a three-dimensional object.

Thus, according to the three-dimensional object determining apparatus of the second embodiment, it is possible to estimate the illumination direction in which light is emitted to the face (object) in the image data including the acquired face (object) and to accurately determine whether or not the person (object) having the image included in the image data is himself (or herself) (three-dimensional object) on the basis of the illumination direction and the direction of the face (object) in the calculated direction of the face in the image data.

The three-dimensional object determining apparatus according to this embodiment includes a control device such as a CPU, a storage device, an external storage device, a display device such as a display, and an input device such as a keyboard or a mouse, and has a hardware structure using a general computer.

A three-dimensional object determining program executed by the three-dimensional object determining apparatus according to this embodiment is recorded as a file of an installable format or an executable format on a computer-readable recording medium such as a CD-ROM, a flexible disk (FD), a CD-R, or a DVD (Digital Versatile Disk), and is provided as a computer program product.

The three-dimensional object determining program executed by the three-dimensional object determining apparatus according to this embodiment may be stored in a computer that is connected through a network such as the Internet may be downloaded and may be provided through the network. In addition, the three-dimensional object determining program executed by the three-dimensional object determining apparatus according to this embodiment may be provided or distributed through a network such as the Internet.

Furthermore, the three-dimensional object determining program according to this embodiment may be incorporated into for example a ROM in advance, and then may be provided.

The three-dimensional object determining program executed by the three-dimensional object determining apparatus according to this embodiment has a module structure including the above-mentioned units (for example, the acquiring unit, the detecting unit, the model storage control unit, the pattern normalizing unit, the estimating unit, the determining unit, the illumination control unit, and the instruction control unit). As the actual hardware, a CPU (processor) reads the three-dimensional object determining program from the above-mentioned storage medium and executes the three-dimensional object determining program. Then, the above-mentioned units are loaded to a main storage device and the acquiring unit, the detecting unit, the model storage control unit, the pattern normalizing unit, the estimating unit, the determining unit, the illumination control unit, and the instruction control unit are generated on the main storage device.

The embodiments may be provided in for example a computer in order to authenticate the user.

According to the embodiments, it is possible to accurately determine whether or not an object included in acquired image data is a three-dimensional object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional object determining apparatus comprising:
   a detecting unit configured to detect a plurality of feature points of an object included in an image data that is acquired;
   a pattern normalizing unit configured to generate a normalized pattern that is normalized by a three-dimensional model from the image data using the plurality of feature points;
   an estimating unit configured to estimate an illumination direction in which light is emitted to the object in the image data from the three-dimensional model and the normalized pattern; and
   a determining unit configured to determine whether or not the object in the image data is a three-dimensional object on the basis of the illumination direction.

2. The apparatus according to claim 1, wherein the estimating unit estimates the illumination direction on the basis of a normal vector of the three-dimensional model and a brightness value of the normalized pattern.

3. The apparatus according to claim 2, wherein the estimating unit calculates a product of a pseudo inverse matrix of a matrix having the normal vector as element and a pattern vector obtained from the normalized pattern and estimates the illumination direction on the basis of the calculated product.

4. The apparatus according to claim 1, wherein the determining unit determines whether or not a face in the image data is the three-dimensional object on the basis of the illumination direction and the direction of the face that is calculated from feature points of the three-dimensional model and the feature points detected from the image data.

5. The apparatus according to claim 1, further comprising:
   an illumination control unit configured to control an illuminating device which emits the light.

6. The apparatus according to claim 1, wherein the pattern normalizing unit generates a plurality of normalized patterns from a plurality of portions of the object in the image data,
   the estimating unit estimates a plurality of illumination directions from the plurality of normalized patterns, and
   the determining unit determines whether or not the object is the three-dimensional object on the basis of the plurality of illumination directions.

7. The apparatus according to claim 1, further comprising:
   an instruction control unit configured to control an instruction device which instructs a user to move a user's face.

8. A three-dimensional object determining method comprising:
   detecting a plurality of feature points of an object included in an image data that is acquired;
   generating a normalized pattern that is normalized by a three-dimensional model from the image data using the plurality of feature points;
   estimating an illumination direction in which light is emitted to the object in the image data from the three-dimensional model and the normalized pattern; and
   determining whether or not the object in the image data is a three-dimensional object on the basis of the illumination direction.

9. A non-transitory computer readable medium including programmed instructions for three-dimensional object determining, wherein the instructions, when executed by a computer, cause the computer to perform:
   detecting a plurality of feature points of an object included in an image data that is acquired;
   generating a normalized pattern that is normalized by a three-dimensional model from the image data using the plurality of feature points;
   estimating an illumination direction in which light is emitted to the object in the image data from the three-dimensional model and the normalized pattern; and
   determining whether or not the object in the image data is a three-dimensional object on the basis of the illumination direction.

* * * * *